Dec. 7, 1937.  M. KAPLAN  2,101,026
EYEGLASSES
Filed Oct. 14, 1936
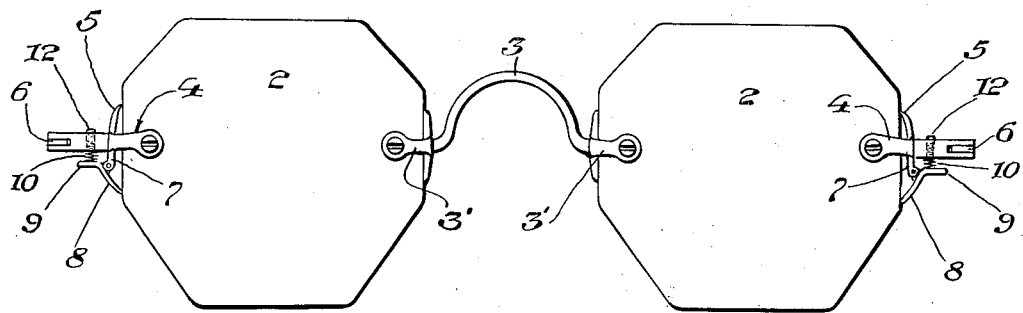
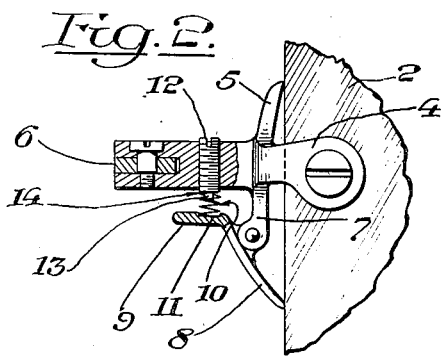 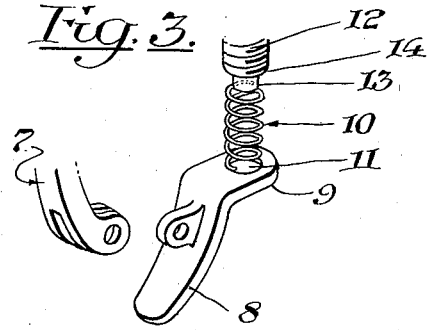
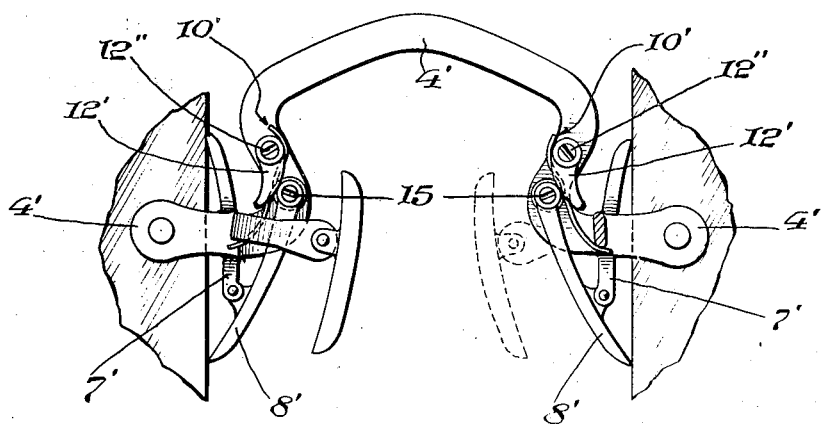
INVENTOR
Morris Kaplan
BY
ATTORNEY Patented Dec. 7, 1937

2,101,026

UNITED STATES PATENT OFFICE 2,101,026

EYEGLASSES

Morris Kaplan, Brooklyn, N. Y.

Application October 14, 1936, Serial No. 105,477

7 Claims. (Cl. 88—47)

This invention relates to eye glasses and more particularly to that class commonly known as rimless glasses, the object of the invention being to provide an improved mounting for the lenses whereby the lens may be rigidly clamped in position without fracturing the lens and whereby also such lenses may be securely clamped in fixed relation to the mounting to prevent the pivotal connection between the lens and the strap from becoming loose and fracturing the lens.

As is well known, if the pivotal connection holding the lens to the strap becomes loose, usually due to the enlargement of the opening through the glass, the lens will shift relative to the pivot and, consequently, any sudden shock given to the lens causes it to break. This also happens frequently when the pivot securing the strap to the lens is fastened too tightly.

In the common form of lens mounting on the market in which the strap is provided with rigid projecting extensions above and below the same to engage the lens, there is no way of tightening these extensions except by taking the lens and mounting apart and bending these extensions to engage the edge of the lens and if they should be bent too tightly into engagement with the lens, the lens is snapped and when the holes in the lens become enlarged, there is no other way of taking up this wear and tear on the lens, all of which disadvantages are overcome by the present improvement.

The present invention is an improvement upon my prior Patent No. 1,212,776, dated January 16th, 1917, an object of the present invention being to materially simplify that prior construction and do away with some of the parts thereof, thereby lessening the cost of manufacture as well as the objectionable feature of having a part in addition to the strap overlap the surface of the lens below the strap which was liable to fracture the lens aside from the fact that by extending over the lens surface, it detracted from the appearance thereof and it also had other disadvantages.

The present improvement may be applied to either the spectacle form of glasses having bows extending over the ears or to what are commonly designated nose glasses.

In the drawing accompanying and forming a part of this specification, Fig. 1 illustrates the improvement applied to the spectacle form of glasses.

Fig. 2 is a partly sectional view illustrating the mounting for one of the lenses.

Fig. 3 is a detail view of the improvement, and

Fig. 4 illustrates the improvement applied to nose glasses.

Similar characters of reference indicate corresponding parts in the several views.

Before explaining in detail the present improvement and mode of operation thereof, I desire to have it understood that the invention is not limited to the details of construction and arrangement of parts which are illustrated in the accompanying drawing since the invention is capable of other embodiments, and that the phraseology which I employ for the purpose of description and not of limitation.

In the form shown in Fig. 1, the lenses 2 having the usual nose bridge 3 secured thereto by straps 3' are provided at the outer edges thereof with lens mountings comprising straps 4. Each of these straps, pivoted to the lens in the usual way, has an upward extension 5 engaging the edge of the lens, this extension being rigid with the strap to which the usual bow 6 is pivoted.

The strap also has a depending extension 7 rigid therewith and to which is pivoted a clamping member or detent 8 having an angled upper end 9 engaged by a coiled spring 10 fitting into a seat or recess 11 of this detent to prevent displacement of the spring.

Carried by the strap is an adjustable member shown as a screw 12 having its lower end provided with a part 13 of less diameter projecting into the spring and forming a shoulder 14 for engagement with the upper end of the spring.

When this screw is rotated, the spring will be compressed, thereby shifting the detent into engagement with the edge of the glass and so clamping it, the spring acting as a cushion.

By this means, the lens is rigidly secured in position on its strap and movement thereof prevented. Furthermore, in the event the lens becomes loose for any reason, the tightening of the screw will take up such play.

In the form shown in Fig. 4, the rigid depending part 7' of the strap 4' is likewise provided with a clamping means or detent 8', the upper end of which is in position to be engaged by an adjustable member 12' somewhat similar to a pawl and secured to the mounting or nose bridge by an adjustable screw 12'' and so secured on the screw that the turning thereof will shift or adjust the pawl, thereby moving the upper end of the detent away from the lens and the lower end into position to firmly clamp such lens.

A cushioning spring 10' is also provided, in this instance being carried by a screw 15 located in the upper end of the detent, the spring engaging the pawl at its upper end and at its lower end the strap secured to the lens.

From the foregoing, it will be observed that in both forms of the invention, the lens clamping member or detent is shifted by means directly engaging the same at the upper end thereof and above its pivotal connection, thus insuring a direct and positive action upon the detent and a positive engagement thereof at its lower end with the edge of the lens and so doing away with any intermediate detent engaging means overlapping the surface of the lens.

It will also be observed that the detent can be forced into engagement with the edge of the glass with any desired degree of pressure always to insure proper clamping and rigidity of the lens and prevent vibration and, therefore, fracture thereof relative to the strap.

It is to be understood that, by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. In an eye glass, the combination with a strap of a lens mounting having means at one side of the strap for engaging the rim of a lens, of a detent pivoted intermediate its ends at the opposite side of said strap and having a part at one side of its pivot in position to engage the rim of the lens, means co-operating with the detent at the opposite side of its pivot thereby to force the detent into engagement with the lens rim, and cushioning means for limiting the clamping action of the detent on the lens.

2. In an eye glass, the combination with a strap of a lens mounting having means at one side of the strap for engaging the rim of a lens, of a detent pivoted intermediate its ends at the opposite side of said strap and having a part at one side of its pivot in position to engage the rim of the lens, and resilient means for engaging the detent at the opposite side of its pivot thereby to force the detent into engagement with the lens rim.

3. In an eye glass, the combination with a strap of a lens mounting having means at one side of the strap for engaging the rim of a lens, of a detent pivoted intermediate its ends at the opposite side of said strap and having a part at one side of its pivot in position to engage the rim of the lens, resilient means for engaging the detent at the opposite side of its pivot thereby to force the detent into engagement with the lens rim, and means for adjusting said resilient means.

4. In an eye glass, the combination with a strap of a lens mounting and having a pair of oppositely extending rigid arms, one in position to engage the rim of a lens, of a detent pivoted intermediate its ends to the other rigid arm and having a part at one side of its pivot in position to engage the rim of a lens, and resilient means for engaging the detent at the opposite side of its pivotal point for forcing it against the lens rim.

5. In an eye glass, the combination with a strap of a lens mounting and having a pair of oppositely extending rigid arms, one in position to engage the rim of a lens, of a detent pivoted intermediate its ends to the other rigid arm and having a part at one side of its pivot in position to engage the rim of a lens, resilient means for engaging the detent at the opposite side of its pivotal point for forcing it against the lens rim, and means for adjusting said resilient means and carried by the strap.

6. In an eye glass, the combination with a strap of a lens mounting having means at one side of the strap for engaging the rim of a lens, of a detent pivoted intermediate its ends at the opposite side of said strap and having a part at one side of its pivot in position to engage the rim of the lens, and spring controlled pivoted means for engaging the detent at the opposite side of its pivot thereby to force the detent into engagement with the lens rim.

7. In an eye glass, the combination with a strap of a lens mounting and having a pair of oppositely extending rigid arms, one in position to engage the rim of a lens, of a detent pivoted intermediate its ends to the other rigid arm and having a part at one side of its pivot in position to engage the rim of a lens and having an annular end, and resilient means for engaging the angular end of the detent at the opposite side of its pivoted point for forcing it against the lens rim.

MORRIS KAPLAN.